(12) United States Patent
Omori et al.

(10) Patent No.: US 9,620,290 B2
(45) Date of Patent: Apr. 11, 2017

(54) MONOLITHIC CERAMIC ELECTRONIC COMPONENT AND METHOD FOR MANUFACTURING THE SAME

(71) Applicant: Murata Manufacturing Co., Ltd., Nagaokakyo-shi, Kyoto-fu (JP)

(72) Inventors: Takashi Omori, Nagaokakyo (JP); Seiji Koga, Nagaokakyo (JP); Jun Ikeda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 111 days.

(21) Appl. No.: 14/680,492

(22) Filed: Apr. 7, 2015

(65) Prior Publication Data

US 2015/0213959 A1  Jul. 30, 2015

Related U.S. Application Data

(63) Continuation of application No. PCT/JP2013/074061, filed on Sep. 6, 2013.

(30) Foreign Application Priority Data

Oct. 9, 2012  (JP) .................................. 2012-224220

(51) Int. Cl.
*H01G 4/228* (2006.01)
*H01G 4/00* (2006.01)
(Continued)

(52) U.S. Cl.
CPC ............... *H01G 4/30* (2013.01); *H01G 4/008* (2013.01); *H01G 4/0085* (2013.01);
(Continued)

(58) Field of Classification Search
CPC ....... H01G 4/228; H01G 4/232; H01G 4/2325
See application file for complete search history.

(56) References Cited

U.S. PATENT DOCUMENTS 8,125,763 B2 *  2/2012  Kobayashi ............. H01G 4/005
                                                          29/25.42
2001/0016252 A1  8/2001  Nagamoto et al.
2009/0323253 A1  12/2009  Kobayashi et al.

FOREIGN PATENT DOCUMENTS

CN  102007557 A  4/2011
JP  H0834168 B2  3/1996
(Continued)

OTHER PUBLICATIONS

International Search Report for PCT/JP2013/074061, dated Oct. 15, 2013.
(Continued)

*Primary Examiner* — Eric Thomas
(74) *Attorney, Agent, or Firm* — Arent Fox LLP

(57) ABSTRACT

A monolithic ceramic electronic component having outer electrodes that include an inorganic substance containing at least Si, a crystal phase C containing at least Si, Ti, and Ba at the interfaces to a ceramic layer in peripheral end portions of the outer electrodes. A value of the crystal phase area ratio indicating the relationship between the area of the crystal phase C and the area of a glass phase G, which are formed at the interface to the ceramic layer, in a region within 5 μm from the peripheral end portion of the outer electrode is within a range of 75% to 98%.

15 Claims, 3 Drawing Sheets

(51) Int. Cl.
*H01G 4/30* (2006.01)
*H01G 4/12* (2006.01)
*H01G 4/232* (2006.01)
*H01G 4/008* (2006.01)
*H01G 4/012* (2006.01)
*H01G 4/248* (2006.01)

(52) U.S. Cl.
CPC ........... *H01G 4/012* (2013.01); *H01G 4/1209* (2013.01); *H01G 4/1227* (2013.01); *H01G 4/2325* (2013.01); *H01G 4/248* (2013.01)

(56) References Cited

FOREIGN PATENT DOCUMENTS

| | | |
|---|---|---|
| JP | H09-190950 A | 7/1997 |
| JP | H09-266129 A | 10/1997 |
| JP | 2001-297626 A | 10/2001 |
| JP | 2010-034503 A | 2/2010 |
| JP | 2012-119616 A | 6/2012 |
| JP | 2012-156171 A | 8/2012 |
| JP | 2012-169334 A | 9/2012 |
| TW | 201007788 A | 2/2010 |

OTHER PUBLICATIONS

Written Opinion of the International Searching Authority for PCT/JP2013/074061, dated Oct. 15, 2013.

\* cited by examiner

MONOLITHIC CERAMIC ELECTRONIC COMPONENT AND METHOD FOR MANUFACTURING THE SAME

CROSS REFERENCE TO RELATED APPLICATIONS

The present application is a continuation of International application No. PCT/JP2013/074061, filed Sep. 6, 2013, which claims priority to Japanese Patent Application No. 2012-224220, filed Oct. 9, 2012, the entire contents of each of which are incorporated herein by reference.

FIELD OF THE INVENTION

The present invention relates to a monolithic ceramic electronic component, for example, a monolithic ceramic capacitor, and a method for manufacturing the same. In particular, the present invention relates to a monolithic ceramic electronic component including outer electrodes disposed on the surface of a monolithic ceramic element, which includes inner electrodes, in such a way as to be connected to the above-described inner electrodes and a method for manufacturing the monolithic ceramic electronic component.

BACKGROUND OF THE INVENTION

For example, a monolithic ceramic capacitor, which is one of representatives of monolithic ceramic electronic components, has a structure including a monolithic ceramic element, in which a plurality of inner electrodes are stacked with ceramic layers therebetween, and outer electrodes disposed on the surface of the monolithic ceramic element in such a way as to be connected to the inner electrodes.

Then, as for the outer electrode of such a monolithic ceramic electronic component, for example, an outer electrode having a two-layer structure composed of a first layer in contact with the surface of a bare chip formed from a ceramic sintered body and a second layer disposed on this first layer by stacking has been proposed, wherein the first layer is formed by using an electrically conductive paste prepared by dispersing a metal resinate in an organic binder and an organic solvent and the second layer is formed by using an electrically conductive paste prepared by dispersing a metal powder in a thermosetting resin and an organic solvent (refer to Patent Document 1).

Also, as for another outer electrode, an outer electrode, which is in contact with the surface of a bare chip formed from a ceramic sintered body and which is formed by using an electrically conductive paste prepared by dispersing a metal resinate in an organic binder and an organic solvent, has been proposed (refer to Patent Document 2).

In this regard, it is mentioned that these outer electrodes exhibit good plating liquid resistance in formation of a plating layer and electronic components including these outer electrodes can realize excellent electrical characteristics, reliability, and mechanical characteristics.

However, in general, the electrically conductive paste containing the metal resinate is expensive and there are problems that, for example, an increase in product cost is caused.

On the other hand, in contrast to these electrically conductive pastes containing the metal resinate, for example, an outer electrode formed by using a metal powder serving as an electrically conductive component, glass frit, and an organic vehicle has also been made available to monolithic ceramic electronic components, e.g., a monolithic ceramic capacitor, widely.

Meanwhile, for example, as shown in FIG. 3, a surface mount monolithic ceramic capacitor 130 has a structure in which outer electrodes 135a and 135b are disposed on both end surfaces 134a and 134b of a sintered monolithic ceramic element 133 (ceramic capacitor element) in such a way as to be connected to inner electrodes 131a and 131b, in general, where in the monolithic ceramic element, a plurality of inner electrodes 131a and 131b are stacked with ceramic layers 132 therebetween.

Then, the outer electrodes 135a and 135b are disposed in such a way as to go around from the both end surfaces 134a and 134b of the monolithic ceramic element 133 to side surfaces 136 of the monolithic ceramic element 133. In this regard, the rectangular parallelepiped ceramic element 133 has four side surfaces and the outer electrodes 135a and 135b go around from both end surfaces 134a and 134b, respectively, to the four side surfaces.

In many cases, Ni plating films are formed on the outer electrodes 135a and 135b to prevent solder leaching (dissolution of an outer electrode into solder), or a Sn plating film is further formed on the Ni plating film to ensure the solderability.

However, in a step to form plating films on the outer electrodes 135a and 135b (plating step), a plating liquid penetrates from the front end portions of the going-around portions (going-around front end portion) 144a and 144b of the outer electrodes 135a and 135b into between the monolithic ceramic element 133 and the outer electrodes 135a and 135b, and ceramic components are eluted. As a result, there is a problem that the reliability is degraded because the strength of the monolithic ceramic element 133 in the vicinity of the going-around front end portions 144a and 144b of the outer electrodes 135a and 135b is reduced, a crack occurs during reflow, and bending strength becomes insufficient.

Patent Document 1: Japanese Unexamined Patent Application Publication No. 9-190950

Patent Document 2: Japanese Unexamined Patent Application Publication No. 9-266129

SUMMARY OF THE INVENTION

The present invention solves the above-described problems and it is an object to provide a highly reliable monolithic ceramic electronic component, where reduction in the strength of a monolithic ceramic element in the vicinity of peripheral end portions of outer electrodes, degradation of the reliability resulting therefrom, and the like are not caused, and a method for manufacturing the same.

In order to solve the above-described problems, a monolithic ceramic electronic component according to the present invention includes a monolithic ceramic element having a structure, in which inner electrodes and ceramic layers are stacked, and outer electrodes disposed on the monolithic ceramic element in such a way as to be electrically connected to the above-described inner electrodes, wherein the above-described outer electrode includes an inorganic substance containing at least Si, a crystal phase containing at least Si, Ti, and Ba is formed at the interfaces to the above-described ceramic layer constituting the above-described monolithic ceramic element in the peripheral end portions of the above-described outer electrodes, and the value of the following crystal phase area ratio indicating the relationship between the area of the above-described crystal phase and the area of a glass phase, which are formed at the interface to the above-described ceramic layer, in a region within 5 μm from the peripheral end portion of the above-described outer electrode is within the range of 75% to 98%.

crystal phase area ratio (%)={crystal phase area/
(crystal phase area+glass phase area)}×100

Also, a method for manufacturing a monolithic ceramic electronic component, according to the present invention, is a method for manufacturing a monolithic ceramic electronic component including a monolithic ceramic element having a structure, in which inner electrodes and ceramic layers are stacked, and outer electrodes disposed on the monolithic ceramic element in such a way as to be electrically connected to the above-described inner electrodes, the method including the steps of applying an electrically conductive paste for forming an outer electrode containing at least Si to the above-described monolithic ceramic element to bring about a state, in which Si, Ti, and Ba are present at the interface between the above-described monolithic ceramic element and the above-described electrically conductive paste, baking the above-described electrically conductive paste to form the above-described outer electrodes, and performing a heat treatment under the condition of a top temperature of 850° C. to 1,000° C. in an atmosphere of an oxygen electromotive force of 650 to 850 mV to generate a crystal phase containing at least Si, Ti, and Ba at the interface to the above-described ceramic layer constituting the above-described monolithic ceramic element in the peripheral end portion of the above-described outer electrode, where the above-described crystal phase is generated in such a way that the value of the following crystal phase area ratio indicating the relationship between the area of the above-described crystal phase and the area of a glass phase in a region within 5 μm from the peripheral end portion of the above-described outer electrode is within the range of 75% to 98%.

crystal phase area ratio (%)={crystal phase area/
(crystal phase area+glass phase area)}×100

As described above, in the monolithic ceramic electronic component according to the present invention, the outer electrode includes an inorganic substance containing at least Si, a crystal phase containing at least Si, Ti, and Ba is formed at the interfaces to the ceramic layer constituting the monolithic ceramic element in the peripheral end portions of the outer electrodes, and the value of the crystal phase area ratio indicating the relationship between the area of the crystal phase and the area of the glass phase, which are formed at the interface to the ceramic layer, in a region within 5 μm from the peripheral end portion of the outer electrode is specified to be within the range of 75% to 98%. Therefore, in the case where a plating film is formed on the surface of the outer electrode, a plating liquid does not penetrate the interface between the peripheral end portion of the outer electrode and the ceramic layer constituting the monolithic ceramic element easily, and even when the plating liquid penetrates the interface between the peripheral end portion of the outer electrode and the ceramic layer, the crystal phase containing Si, Ti, and Ba has excellent plating liquid resistance, so that penetration of the plating liquid into the inner part can be suppressed or prevented.

As a result, elution of ceramic constituents from the ceramic layer in the vicinity of the peripheral end portion of the outer electrode can be suppressed, so that a highly reliable monolithic ceramic electronic component can be obtained, where the possibility of causing reduction in the strength of a monolithic ceramic element, degradation of the reliability resulting therefrom, and the like is low.

As described above, in the method for manufacturing a monolithic ceramic electronic component, according to the present invention, the outer electrodes are formed by baking the electrically conductive paste and, thereafter, a heat treatment is performed under the above-described predetermined condition to generate a crystal phase containing at least Si, Ti, and Ba at the interfaces to the ceramic layer constituting the monolithic ceramic element in the peripheral end portions of the outer electrodes, where the crystal phase is generated in such a way that the value of the crystal phase area ratio indicating the relationship between the area of the crystal phase and the area of the glass phase in the region within 5 μm from the peripheral end portion of the outer electrode is within the range of 75% to 98%. Therefore, even in the case where a plating film is formed on the surface of the outer electrode, the plating liquid does not penetrate the interface between the peripheral end portion of the outer electrode and the ceramic layer easily, and a highly reliable monolithic ceramic electronic component can be reliably produced, where elution of ceramic constituents and reduction in the strength of the monolithic ceramic element resulting therefrom in the vicinity of the going-around front end portion of the outer electrode are not caused.

DETAILED DESCRIPTION OF THE
PREFERRED EMBODIMENTS

The features of the present invention will be described below in further detail with reference to the embodiments according to the present invention.

[Monolithic Ceramic Capacitor]

Figure 1:
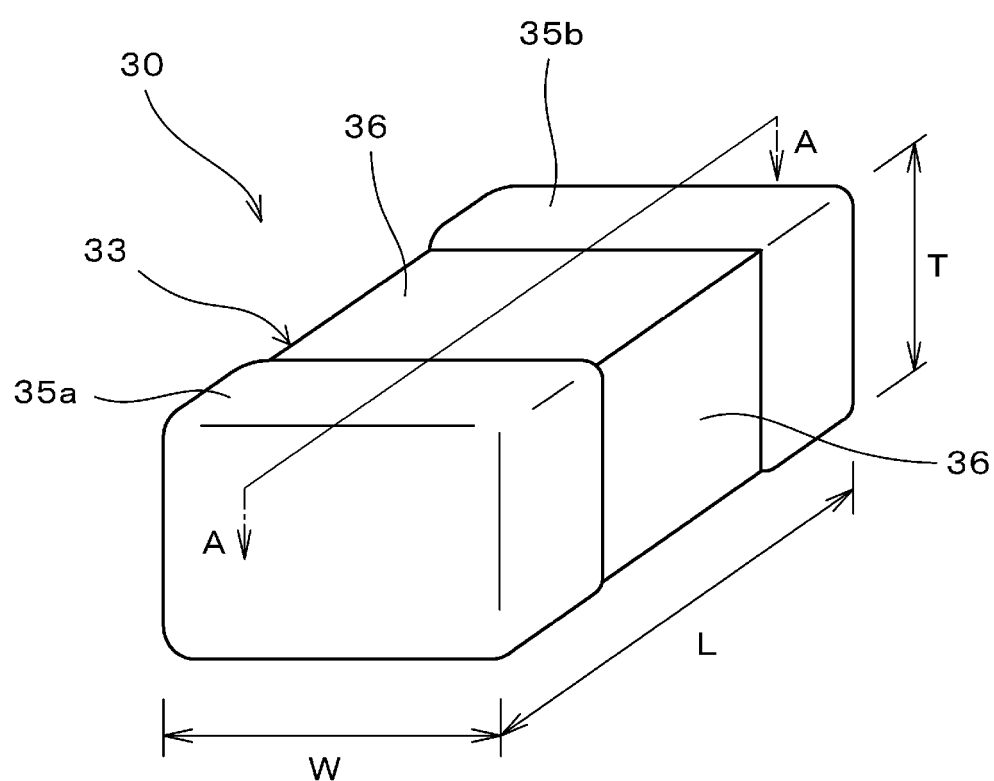
FIG. 1 is a perspective view schematically showing the configuration of a monolithic ceramic electronic component according to an embodiment of the present invention.
Figure 2:
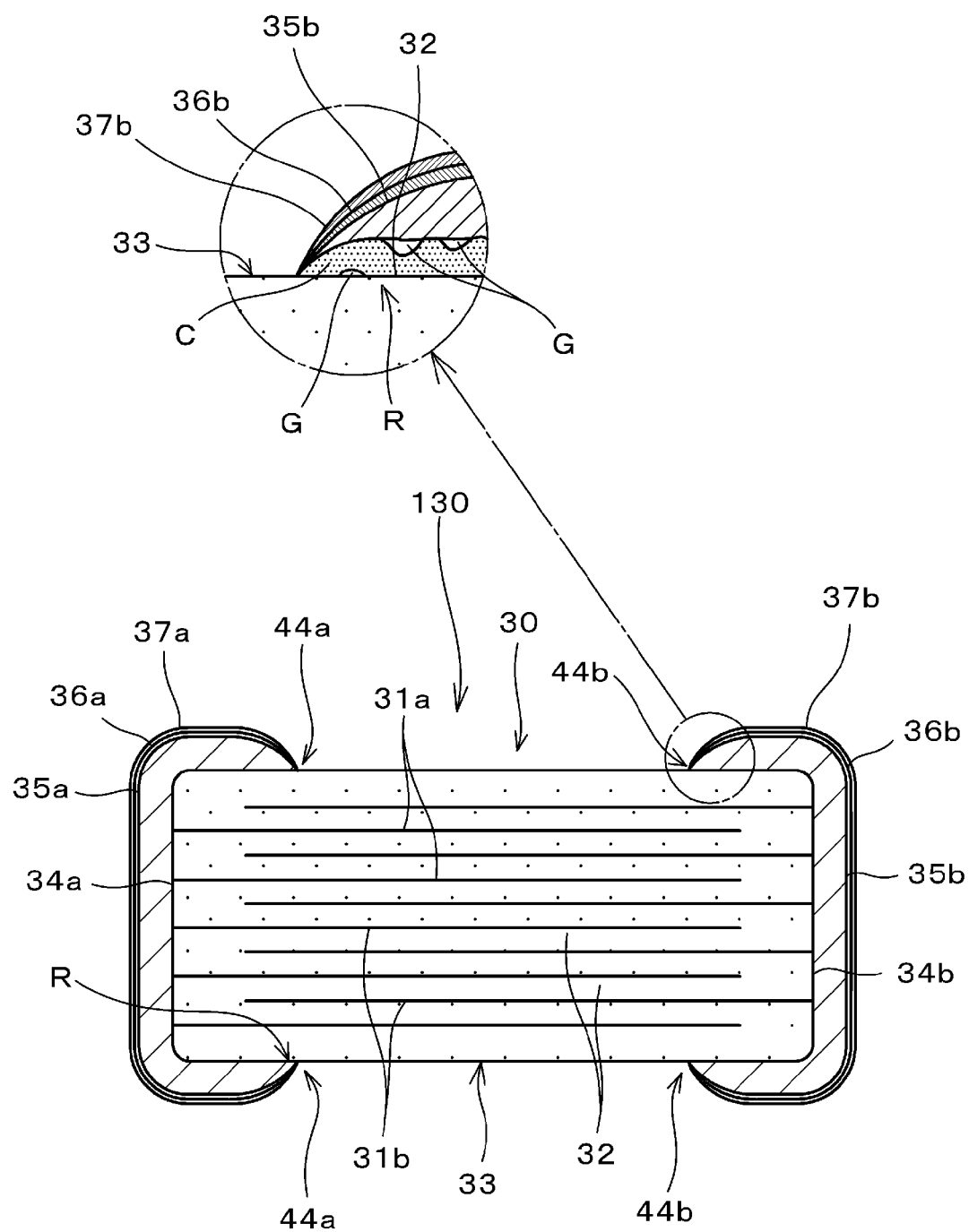
FIG. 2 is a sectional view schematically showing the configuration of a monolithic ceramic electronic component according to an embodiment of the present invention.
Figure 3:
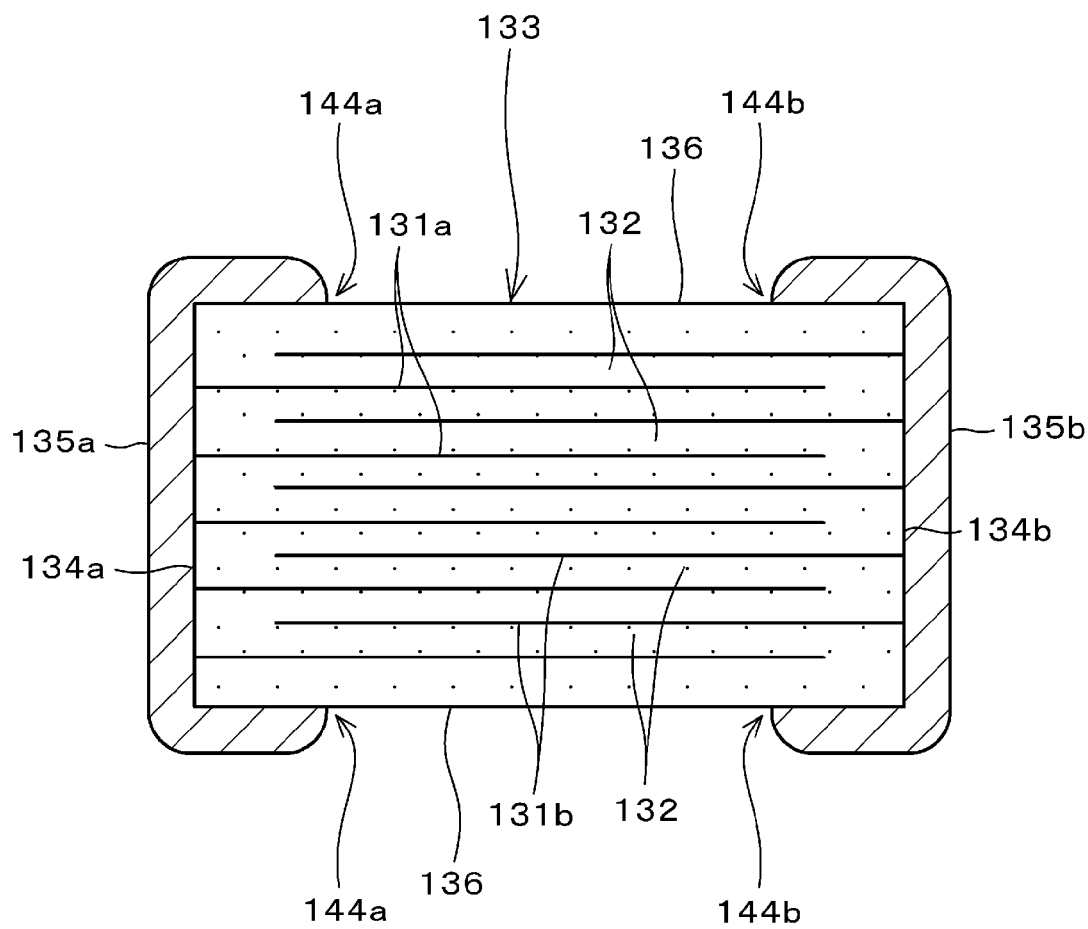
FIG. 3 is a sectional view showing the configuration of a common monolithic ceramic electronic component (monolithic ceramic capacitor).

FIG. 1 is a perspective view showing a monolithic ceramic electronic component (here, monolithic ceramic capacitor) according to an embodiment of the present invention. FIG. 2 is a sectional view of a cross-section taken along a line A-A shown in FIG. 1.

As shown in FIGS. 1 and 2, a monolithic ceramic capacitor 30 includes a sintered monolithic ceramic element 33 (ceramic capacitor element) in which a plurality of inner electrodes 31a and 31b are stacked with ceramic layers 32 therebetween.

Meanwhile, one end of the inner electrodes 31a and 31b are led to respective end surfaces 34a and 34b of the monolithic ceramic element 33.

Then, a pair of outer electrodes 35a and 35b are disposed on both end surfaces of 34a and 34b of the monolithic ceramic element 33 in such a way as to be connected to the inner electrodes 31a and 31b, respectively.

The outer electrodes 35a and 35b are disposed in such a way as to extend from the respective end surfaces 34a and 34b of the monolithic ceramic element 33 to side surfaces 36 of the monolithic ceramic element 33. In this regard, the rectangular parallelepiped ceramic element 33 has four side surfaces 36 and the outer electrodes 35a and 35b extend from the surfaces 34a and 34b, respectively, to the four side surfaces 36.

In addition, as schematically shown in FIG. 2, this monolithic ceramic capacitor 30 has a configuration in which predetermined proportions of crystal phase C containing at least Si, Ti, and Ba and glass phase G are present at the interface between the front end portions of the going-around portions (peripheral end portions) 44a and 44b of the outer electrodes 35a and 35b and the ceramic layer 32 constituting the monolithic ceramic element 33.

That is, in the configuration, the value of the crystal phase area ratio (crystal phase area ratio (%)={crystal phase area/(crystal phase area+glass phase area)}×100) indicating the relationship between the area of the crystal phase C and the area of the glass phase G, which are formed at the interfaces between the outer electrodes 35a and 35b and the ceramic layer 32 constituting the monolithic ceramic element 33, in a region R (FIG. 2) within 5 μm from the front end portions of the going-around portions (peripheral end portions) 44a and 44b of the outer electrodes 35a and 35b is specified to be within the range of 75% to 98%.

Meanwhile, in this monolithic ceramic capacitor 30, the ceramic layer 32 is formed from dielectric ceramics having a perovskite structure containing Ba and Ti as primary components and the inner electrodes 31a and 31b are base metal electrodes made from Ni.

Also, the outer electrodes 35a and 35b are Cu-baking electrode layers formed by applying and baking an electrically conductive paste in which an electrically conductive component is a Cu powder and glass frit and the like are added thereto.

Also, Ni plating films 36a and 36b are formed on the outer electrodes 35a and 35b and Sn plating films 37a and 37b are further formed on the Ni plating films 36a and 36b.

[Method for Manufacturing Monolithic Ceramic Capacitor]

Next, a method for manufacturing the monolithic ceramic capacitor 30 according to an embodiment of the present invention will be described.

(1) To begin with, a ceramic slurry is prepared by mixing a predetermined blending ratio of organic binder, organic solvent, plasticizer, and dispersing agent with a ceramic dielectric powder made from a perovskite compound containing Ba and Ti.

(2) Thereafter, a ceramic green sheet is produced by sheet-forming the resulting ceramic slurry on a resin film in such a way that the thickness after drying becomes 4.0 μm.

(3) Subsequently, an electrically conductive paste for forming an inner electrode is screen-printed on the resulting ceramic green sheet with a pattern corresponding to the size (width: 3.2 mm, length: 1.6 mm) of monolithic ceramic element after firing in such a way that the thickness after drying becomes 2 μm.

In this regard, the electrically conductive components (metal components) used for the electrically conductive paste for forming an inner electrode are not specifically limited. An electrically conductive paste by using Ni, Ni alloys, Cu, Cu alloys, and the like, which are base metal powders, can be used appropriately.

In this embodiment, an electrically conductive paste produced by blending 50 parts by weight of Ni powder having an average particle diameter of 0.3 μm, 45 parts by weight of resin solution in which 10 parts by weight of ethyl cellulose is dissolved in Butyl Carbitol, and the remainder of dispersing agent and thickener is used.

(4) Then, the ceramic green sheet with the screen-printed electrically conductive paste is peeled off the resin film, and 350 ceramic green sheets are stacked and contact-bonded to form a multilayer body. The resulting multilayer body is cut into a predetermined size and, thereby, is divided into individual unfired monolithic ceramic elements (chips).

(5) Thereafter, the individual divided monolithic ceramic elements are subjected to a degreasing treatment under the condition of 400° C. and 10 hr in a nitrogen atmosphere and is fired under the condition of a top temperature of 1,200° C. and an oxygen partial pressure of $10^{-9}$ to $10^{-10}$ MPa in a nitrogen-hydrogen-water vapor mixed atmosphere.

(6) Next, an electrically conductive paste (outer electrode paste) including 70 parts by weight of Cu powder, 10 parts by weight of glass frit in which zinc borosilicate glass frit and quartz are mixed at 8:2, and 20 parts by weight of resin solution in which 20 parts by weight of ethyl cellulose is dissolved in Butyl Carbitol is applied to the resulting fired monolithic ceramic element by a dipping method in such a way that the thickness after drying becomes 50 μm, and firing is performed. In this regard, the thickness of the electrically conductive paste applied is a thickness on both end surfaces 34a and 34b of the monolithic ceramic element 33.

(7) Thereafter, outer electrodes (Cu-baking electrode layers) are formed by performing firing under the condition of a top temperature of 800° C. and an oxygen electromotive force of 280 mV in a nitrogen-air-water vapor mixed atmosphere or nitrogen-hydrogen-water vapor mixed atmosphere.

(8) Subsequently, the monolithic ceramic element after the outer electrodes (Cu-baking electrode layers) are formed is heat-treated under the condition shown in Table 1, so that predetermined proportions of crystal phase containing at least Si, Ti, and Ba and glass phase are generated at the interfaces to the ceramic layer in the peripheral end portions of the outer electrodes.

In this regard, the samples of Test Nos. 1 and 2 in Table 1 are samples of comparative examples in which the heat treatment condition does not satisfy the requirements according to the present invention, and the samples of Test Nos. 3 to 8 are samples of examples in which the heat treatment condition satisfies the requirements according to the present invention.

(9) Then, Ni plating is applied to the outer electrodes (Cu-baking electrode layers) to form Ni plating films in such a way as to cover the outer electrodes and Sn plating is further applied to the Ni plating films and, thereby, Sn plating films are formed in such a way as to cover the Ni plating films.

Consequently, a monolithic ceramic capacitor having a structure shown in FIGS. 1 and 2 is obtained.

[Evaluation of Characteristics]

As for the sample (monolithic ceramic capacitor) produced as described above, the state of generation (crystal phase area ratio) of the crystal phase C (FIG. 2) and the glass phase G (FIG. 2), which are formed at the interface between the outer electrodes 35a and 35b and the ceramic layer 32 constituting the monolithic ceramic element 33 in the region R (FIG. 2) within 5 μm from the front end portions of the going-around portions (peripheral end portions) 44a and 44b of the outer electrodes 35a and 35b and the element characteristics of the crystal phase were examined and, in addition, a bending test was performed. Explanations will be made below.

(1) State of Generation of Crystal Phase and Glass Layer

In order to examine the state of generation the crystal phase and the glass phase at the interface to the ceramic layer in the region R within 5 μm from the front end portions of the going-around portions (peripheral end portions) of the outer electrodes, the regions R within 5 μm from the peripheral end portions 44a and 44b of the outer electrodes 35a and 35b at four corners of a cross-section of the central portion in the width (W) direction of the monolithic ceramic capacitor, where the cross-section was taken by cutting along the length (L) direction in the thickness (T) direction (refer to FIG. 2), were subjected to a polishing treatment by using FIB (focused iron beam) and observation was performed by using SIM (secondary ion microscopy).

The areal relationship between the crystal phase and the glass phase at the interface to the ceramic layer in the region within 5 μm from the peripheral end portion of the outer electrode was examined on the basis of a difference in channeling contrast of the SIM image observed.

Also, as for the place determined to be a crystal phase, the place was cut by FIB forming, spot diffraction was performed by using TEM (transmission electron microscope) and, thereby, presence of a crystal peak was ascertained.

Also, as for the place determined to be a glass phase as well, the place was cut by FIB forming in the same manner, spot diffraction was performed by using TEM and, thereby, no presence of a crystal peak was ascertained.

In addition, crystal phases and glass phases determined on the basis of the SIM image were marked, each area was calculated by image processing, and an average of crystal phase area ratios was determined on the basis of the following formula (calculation was performed by rounding off the number to the nearest integer).

crystal phase area ratio (%)={crystal phase area/
(crystal phase area+glass phase area)}×100

The results thereof are collectively shown in Table 1.

(2) Element Characteristics of Crystal Phase

In order to examine the composition of the crystal phase at the interface between the outer electrode and the ceramic layer in the region within 5 μm from the peripheral end portion of the outer electrode, the interfaces between the outer electrodes and the ceramic layers at four corners of a cross-section of the central portion in the width (W) direction of the monolithic ceramic capacitor, where the cross-section was taken by cutting along the length (L) direction in the thickness (T) direction (refer to FIG. 2), were subjected to a polishing treatment by using FIB and qualitative analysis was performed by using FE-WDX (field-emission wavelength-dispersive X-ray spectrometry) to examine presence of Si, Ba, and Ti elements. The results thereof are collectively shown in Table 1.

TABLE 1

| | Heat treatment condition | | | | | | |
|---|---|---|---|---|---|---|---|
| Test No. | Top temperature (° C.) | Oxygen electromotive force at top temperature (mv) | Top temperature keeping time (min) | Crystal phase area ratio (%) | Presence of Si, Ba, and Ti in crystal phase | Crack occurrence rate in bending test (%) | Evaluation |
| 1* | none | none | none | 35 | yes | 25 | x |
| 2* | 800 | 500 | 120 | 70 | yes | 5 | x |
| 3 | 850 | 650 | 60 | 75 | yes | 0 | ○ |
| 4 | 850 | 850 | 60 | 89 | yes | 0 | ○ |
| 5 | 900 | 650 | 120 | 82 | yes | 0 | ○ |
| 6 | 900 | 850 | 180 | 98 | yes | 0 | ○ |
| 7 | 1000 | 850 | 60 | 90 | yes | 0 | ○ |
| 8 | 1000 | 650 | 120 | 91 | yes | 0 | ○ |

(3) Bending Test

The monolithic ceramic capacitor (sample) produced as described above was solder-mounted on a glass epoxy substrate, a load was applied at a speed of 1.0 mm/s, and after the amount of bending reached 1.5 mm, keeping was performed for 5±1 s. Subsequently, a cross-section of the monolithic ceramic capacitor was polished and the polished surface was observed to examine presence or absence of an occurrence of a crack. Then, the crack occurrence rate was calculated from the number of samples, in which an occurrence of crack was observed, relative to the samples subjected to the test (n=20). The results thereof are collectively shown in Table 1.

As is ascertained from Table 1, in the cases of the sample of Test No. 1 which was not subjected to a heat treatment (heat treatment to generate crystal phase) after formation of the outer electrodes (Cu-baking electrode layers) and the sample of Test No. 2 which was subjected to the heat treatment under the heat treatment condition not satisfying the requirements (top temperature and oxygen electromotive force of atmosphere) according to the present invention, cracks occurred in the bending test at high rates.

On the other hand, as for each of the samples of Test Nos. 3 to 8 subjected to heat treatment under the condition satisfying the requirements according to the present invention, it was ascertained that the crystal phase area ratio at the interface between the outer electrode and the ceramic layer in the region within 5 μm from the front end portion of the going-around portion (peripheral end portion) of the outer electrode was within the range of 75% to 98% and the result of the bending test was good.

Also, it was ascertained that the above-described crystal phase was a crystal phase containing at least Si, Ba, and Ti. In this regard, this crystal phase is not eluted into the Ni plating liquid. Therefore, the crystal phase increases and, as a result, the Ni plating liquid resistance of the front end portion of the going-around portion (peripheral end portion) of the outer electrode is improved and the strength is enhanced.

Meanwhile, in this embodiment, the upper limit of the crystal phase area ratio was 98%. This is because the manufacturing method in this embodiment was able to produce only samples exhibiting crystal phase area ratios of up to 98%.

In the above-described embodiment, the case where Si contained in the crystal phase was supplied from the electrically conductive paste (outer electrode paste) and Ti and Ba were supplied from the ceramic layer constituting the monolithic ceramic element (that is, the case where the crystal phase containing Si derived from the electrically conductive paste and Ti and Ba derived from the ceramic layer was formed) was explained as an example. However, in the present invention, Si, Ti, and Ba constituting the crystal phase may be contained in the outer electrode-forming material (outer electrode paste) or be contained in the ceramic layer constituting the monolithic ceramic element.

Also, any part of Si, Ti, and Ba may be contained in the outer electrode-forming material (outer electrode paste) and the remainder may be contained in the ceramic layer.

For specific example, all Si, Ti, and Ba may be contained in a glass component constituting the outer electrode-forming material (outer electrode paste). For example, in the case where borosilicate glass containing Ti and Ba is used as a glass material constituting the outer electrode paste for the purpose of improving the characteristics of the outer electrode paste, a ceramic material not containing Ti and Ba may be used as the ceramic layer constituting the monolithic ceramic element.

Furthermore, with respect to other points as well, the present invention is not limited to the above-described embodiments. With respect to, for example, specific disposition form of inner electrodes and outer electrodes constituting the monolithic ceramic electronic component and specific conditions in the case where the plating film is formed, various applications and modifications can be added within the scope of the invention.

REFERENCE SIGNS LIST 30 monolithic ceramic capacitor
31a, 31b inner electrode
32 ceramic layer
33 sintered monolithic ceramic element
34a, 34b both end surfaces of ceramic capacitor element
35a, 35b outer electrode
36 side surface of monolithic ceramic element
36a, 36b Ni plating film
37a, 37b Sn plating film
44a, 44b front end portion of going-around portion (peripheral end portion) of outer electrode
C crystal phase
G glass phase
R region within 5 μm from peripheral end portion of outer electrode
L length of monolithic ceramic capacitor
T thickness of monolithic ceramic capacitor
W width of monolithic ceramic capacitor

The invention claimed is:

1. A monolithic ceramic electronic component comprising:
a monolithic ceramic element having alternately stacked inner electrodes and ceramic layers; and
at least a pair of outer electrodes disposed on the monolithic ceramic element and electrically connected to respective sets of the inner electrodes,
wherein the outer electrode includes an inorganic substance containing at least Si,
peripheral end portions of the outer electrodes include a crystal phase containing at least Si, Ti, and Ba at an interface to the ceramic layer of the monolithic ceramic element, and
a value of a crystal phase area ratio indicating a relationship between an area of the crystal phase and an area of a glass phase at the interface to the ceramic layer, in a region within 5 μm from the peripheral end portion of the outer electrode, is within a range of 75% to 98%, wherein the crystal phase area ratio (%)={the area of the crystal phase/(the area of the crystal phase+the area of glass phase area)}×100%).

2. The monolithic ceramic electronic component according to claim 1, wherein the ceramic layers have a perovskite structure containing Ba and Ti as primary components.

3. The monolithic ceramic electronic component according to claim 2, wherein the inner electrodes are base metal electrodes containing Ni.

4. The monolithic ceramic electronic component according to claim 1, wherein the inner electrodes are base metal electrodes containing Ni.

5. The monolithic ceramic electronic component according to claim 1, wherein the outer electrodes are Cu-baked electrode layers.

6. The monolithic ceramic electronic component according to claim 5, further comprising Ni plating films on the outer electrodes.

7. The monolithic ceramic electronic component according to claim 6, further comprising Sn plating films on the Ni plating films.

8. The monolithic ceramic electronic component according to claim 1, further comprising Ni plating films on the outer electrodes.

9. The monolithic ceramic electronic component according to claim 8, further comprising Sn plating films on the Ni plating films.

10. A method for manufacturing a monolithic ceramic electronic, the method comprising:
applying an electrically conductive paste for forming an outer electrode containing at least Si to a monolithic ceramic element so that Si, Ti, and Ba are present at an interface between the monolithic ceramic element and the electrically conductive paste;
baking the electrically conductive paste to form outer electrodes; and
performing a heat treatment under a condition of a top temperature of 850° C. to 1,000° C. in an atmosphere of an oxygen electromotive force of 650 to 850 mV to generate a crystal phase containing at least Si, Ti, and Ba at the interface in a peripheral end portion of the outer electrode,
wherein a value of a crystal phase area ratio indicating a relationship between an area of the crystal phase and an area of a glass phase in a region within 5 μm from the peripheral end portion of the outer electrode is within a range of 75% to 98%, wherein the crystal phase area ratio (%)={the area of the crystal phase/(the area of crystal phase+the area of the glass phase)}×100%).

11. The method for manufacturing a monolithic ceramic electronic component according to claim 10, wherein the outer electrodes are Cu-baked electrode layers formed by performing firing under a condition of a top temperature of 800° C. and an oxygen electromotive force of 280 mV in a nitrogen-based mixed atmosphere.

12. The method for manufacturing a monolithic ceramic electronic component according to claim 11, further comprising forming Ni plating films on the outer electrodes.

13. The method for manufacturing a monolithic ceramic electronic component according to claim 12, further comprising forming Sn plating films on the Ni plating films.

14. The method for manufacturing a monolithic ceramic electronic component according to claim 10, further comprising forming Ni plating films on the outer electrodes.

15. The method for manufacturing a monolithic ceramic electronic component according to claim 14, further comprising forming Sn plating films on the Ni plating films.

* * * * *